(12) United States Patent
Nakamatsu et al.

(10) Patent No.: US 11,486,484 B2
(45) Date of Patent: Nov. 1, 2022

(54) MOTOR ASSEMBLY

(71) Applicants: Nidec Corporation, Kyoto (JP); Nidec Tosok Corporation, Zama (JP)

(72) Inventors: Shuhei Nakamatsu, Kyoto (JP); Keisuke Fukunaga, Kyoto (JP); Naohiro Wada, Kyoto (JP); Masumi Mizutani, Zama (JP)

(73) Assignees: NIDEC CORPORATION, Kyoto (JP); NIDEC TOSOK CORPORATION, Kanagawa (JP)

(*) Notice: Subject to any disclaimer, the term of this patent is extended or adjusted under 35 U.S.C. 154(b) by 513 days.

(21) Appl. No.: 16/655,344

(22) Filed: Oct. 17, 2019

(65) Prior Publication Data

US 2020/0127527 A1    Apr. 23, 2020

(30) Foreign Application Priority Data

Oct. 22, 2018 (JP) .............................. JP2018-198507
Jan. 8, 2019 (JP) .............................. JP2019-001240

(51) Int. Cl.
*F16H 57/03* (2012.01)
*F16H 57/04* (2010.01)
(Continued)

(52) U.S. Cl.
CPC .............. *F16H 57/03* (2013.01); *B60K 1/00* (2013.01); *B60K 17/04* (2013.01); *F01M 1/02* (2013.01);
(Continued)

(58) Field of Classification Search
CPC .................................. H02K 5/22; H02K 5/225
(Continued)

(56) References Cited

U.S. PATENT DOCUMENTS 11,239,724 B2 * 2/2022 Nakamatsu .............. H02K 9/19
2015/0121767 A1   5/2015 Nagamori et al.
(Continued)

FOREIGN PATENT DOCUMENTS

CA      104810962 A     7/2015
CN      104999896 A    10/2015
(Continued)

OTHER PUBLICATIONS

Ogasawara et al., "Motor Assembly", U.S. Appl. No. 16/655,353, filed Oct. 17, 2019.
(Continued)

*Primary Examiner* — Quyen P Leung
*Assistant Examiner* — Minki Chang
(74) *Attorney, Agent, or Firm* — Keating & Bennett (57) ABSTRACT

A motor assembly includes a motor, a housing that accommodates the motor, an inverter electrically connected to the motor, an inverter case that accommodates the inverter, an auxiliary device provided in a lower portion of the housing to oppose a road surface, a wire harness that includes a first connector connected to a connector provided in the inverter case, a second connector connected to a connector provided in the auxiliary device, and an electric wire connecting the
(Continued)

first connector and the second connector, and a lower connector cover provided in the lower portion of the housing and covering the second connector from a lower side.

18 Claims, 8 Drawing Sheets

(51) Int. Cl.
| | | |
|---|---|---|
| *B60K 1/00* | (2006.01) | |
| *B60K 17/04* | (2006.01) | |
| *F01M 1/02* | (2006.01) | |
| *H02K 5/22* | (2006.01) | |
| *H02K 7/00* | (2006.01) | |
| *H02K 9/19* | (2006.01) | |
| *H02P 27/04* | (2016.01) | |
| *F16H 57/02* | (2012.01) | |

(52) U.S. Cl.
CPC ..... *F16H 57/0441* (2013.01); *F16H 57/0476* (2013.01); *H02K 5/225* (2013.01); *H02K 7/006* (2013.01); *H02K 9/19* (2013.01); *H02P 27/04* (2013.01); *B60K 2001/001* (2013.01); *F01M 2001/0215* (2013.01); *F16H 2057/02052* (2013.01)

(58) Field of Classification Search
USPC .................................................. 310/71, 418
See application file for complete search history.

(56) References Cited

U.S. PATENT DOCUMENTS

| | | |
|---|---|---|
| 2015/0129345 A1 | 5/2015 | Suzuki et al. |
| 2015/0214812 A1 | 7/2015 | Tooyama et al. |
| 2015/0305177 A1 | 10/2015 | Nakashima |
| 2016/0185232 A1* | 6/2016 | Suzuki ................. B60K 6/26 903/945 |
| 2017/0158042 A1* | 6/2017 | Miyazawa ............... B60L 1/02 |
| 2020/0124161 A1* | 4/2020 | Ogasawara ............ H02K 7/116 |
| 2020/0127528 A1* | 4/2020 | Nakamatsu ............ H02P 25/16 |

FOREIGN PATENT DOCUMENTS

| | | | |
|---|---|---|---|
| JP | 2012-175853 A | 9/2012 | |
| JP | 2013-237413 A | 11/2013 | |
| KR | 2017098076 A * | 8/2017 | .......... B60L 11/1803 |

OTHER PUBLICATIONS

Nakamatsu et al., "Motor Assembly", U.S. Appl. No. 16/655,350, filed Oct. 17, 2019.

Nakamatsu et al., "Motor Assembly", U.S. Appl. No. 16/655,361, filed Oct. 17, 2019.

Official Communication issued in corresponding Chinese Patent Application No. 201910998494.X, dated Nov. 1, 2021.

* cited by examiner

MOTOR ASSEMBLY

CROSS REFERENCE TO RELATED APPLICATION

The present invention claims priority under 35 U.S.C. § 119 to Japanese Application No. 2018-198507 filed on Oct. 22, 2018 and Japanese Application No. 2019-001240 filed on Jan. 8, 2019, the entire contents of each application being hereby incorporated herein by reference.

1. FIELD OF THE INVENTION

The present invention relates to a motor assembly.

2. BACKGROUND

Conventionally, a motor assembly that rotates an axle of a vehicle has been known. The conventional motor assembly includes an oil pump that circulates oil in the unit.

The motor assembly that rotates the axle is disposed near a lower surface of the vehicle. Since a lower surface of the motor assembly faces a road surface, electrical components mounted on the motor assembly are disposed at positions where flying stones entering the lower surface of the vehicle, road surface water, and the like hardly come into contact. Thus, the arrangement of the components in the motor assembly is restricted.

SUMMARY

According to one example embodiment of the present disclosure, a motor assembly includes a motor, a housing that accommodates the motor, an inverter electrically connected to the motor, an inverter case that accommodates the inverter, an auxiliary device provided in a lower portion of the housing so as to oppose a road surface, a wire harness that includes a first connector connected to a connector provided in the inverter case, a second connector connected to a connector provided in the auxiliary device, an electric wire connecting the first connector and the second connector, and a lower connector cover provided in the lower portion of the housing and covering the second connector from a lower side.

The above and other elements, features, steps, characteristics and advantages of the present disclosure will become more apparent from the following detailed description of the example embodiments with reference to the attached drawings.

DETAILED DESCRIPTION

Figure 1:
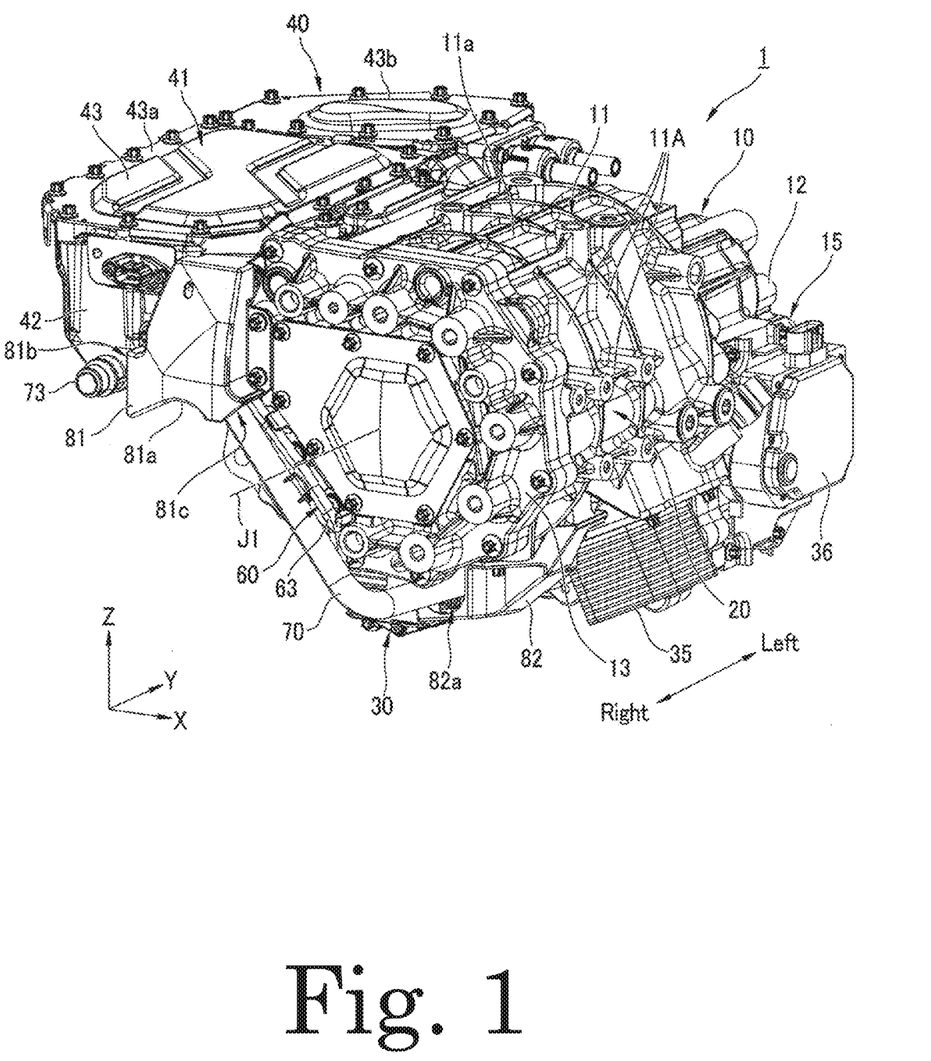
FIG. 1 is a perspective view of a motor assembly according to an example embodiment of the present disclosure as viewed from above.

In the following description, a description will be given by defining a vertical direction based on a positional relationship when a motor assembly 1 according to an example embodiment of the disclosure illustrated in FIG. 1 is mounted on a vehicle located on a horizontal road surface. In the accompanying drawings, an XYZ coordinate system is illustrated appropriately as a three-dimensional orthogonal coordinate system. In the XYZ coordinate system, a Z-axis direction is the vertical direction in which a +Z side is an upper side and a −Z side is a lower side. An X-axis direction is a direction orthogonal to the Z-axis direction and is a front-rear direction of the vehicle on which the motor assembly 1 is mounted. In the present example embodiment, a +X side is a front side of the vehicle, and a −X side is a rear side of the vehicle. A Y-axis direction is a direction orthogonal to both the X-axis direction and the Z-axis direction, and is a left-right direction of the vehicle. In the present example embodiment, a +Y side is a left side of the vehicle, and a −Y side is a right side of the vehicle. In the present example embodiment, the right side corresponds to one side in an axial direction, and the left side corresponds to the other side in the axial direction. In addition, the front-rear direction corresponds to a predetermined direction in the present example embodiment.

Incidentally, the positional relationship in the front-rear direction is not limited to the positional relationship in the present example embodiment, and the +X side may be the rear side of the vehicle, and the −X side may be the front side of the vehicle. In this case, the +Y side is the right side of the vehicle, and the −Y side is the left side of the vehicle.

A motor axis J1 illustrated as appropriate in the drawings extends in the Y-axis direction, that is, the left-right direction of the vehicle. In the following description, a direction parallel to the motor axis J1 is simply referred to as the "axial direction", a radial direction having its center on the motor axis J1 is simply referred to as the "radial direction", and a circumferential direction having its center on the motor axis J1, that is, the axial circumference of the motor axis J1, is simply referred to as the "circumferential direction" unless otherwise noted. In the present specification, the "parallel direction" also includes a substantially parallel direction, and the "orthogonal direction" also includes a substantially orthogonal direction.

The motor assembly 1 is mounted on a vehicle using a motor as a motive power source, such as a hybrid electric vehicle (HEV), a plug-in hybrid vehicle (PHV), and an electric vehicle (EV), and is used as the motive power source. As illustrated in FIGS. 1 to 4, the motor assembly 1 includes a housing 10, a motor 20, and an inverter assembly 40. Although not illustrated, the motor assembly 1 includes a speed reducer and a differential device.

Figure 2:
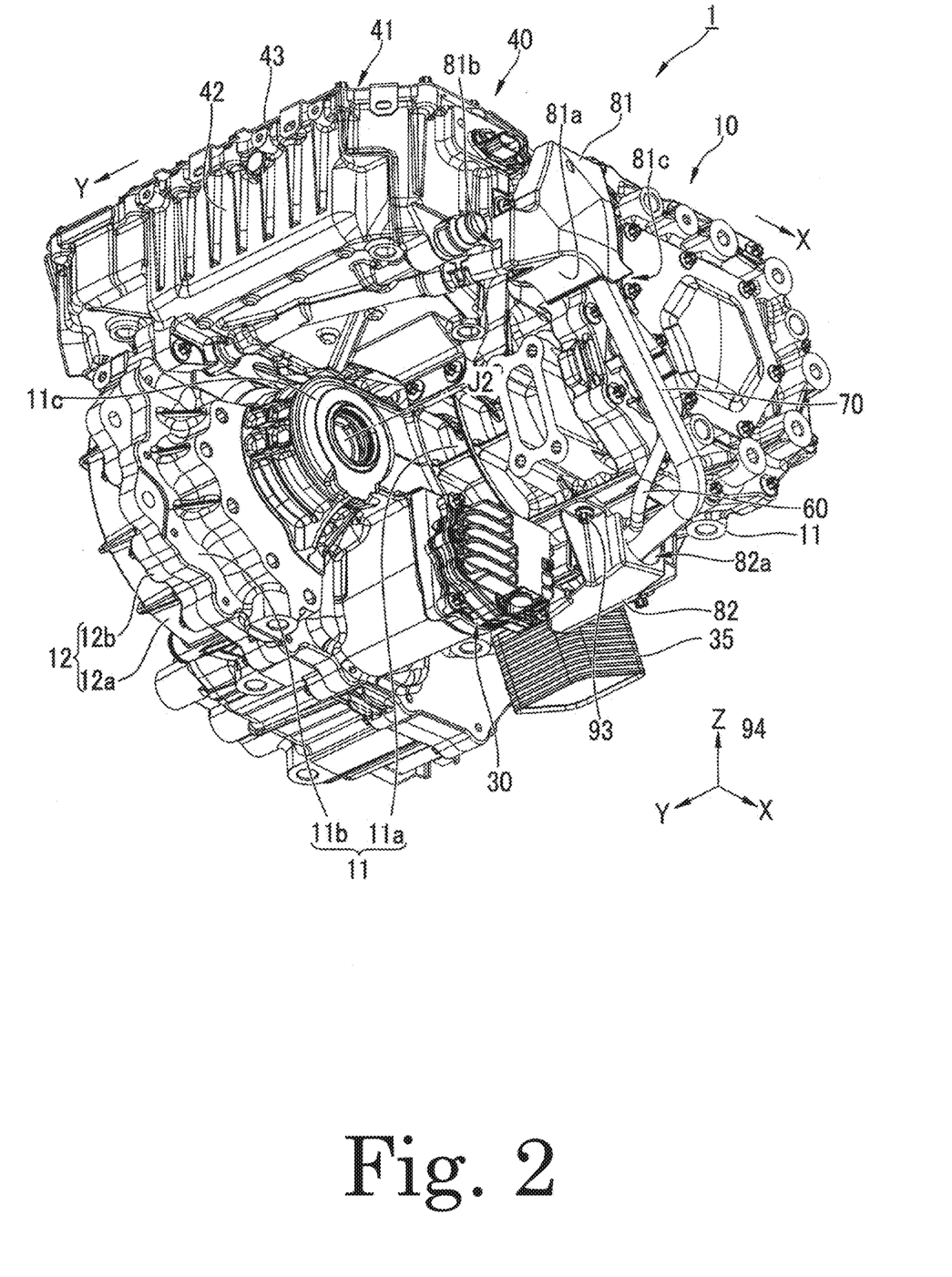
FIG. 2 is a perspective view of a motor assembly according to an example embodiment of the present disclosure as viewed from below.
Figure 3:
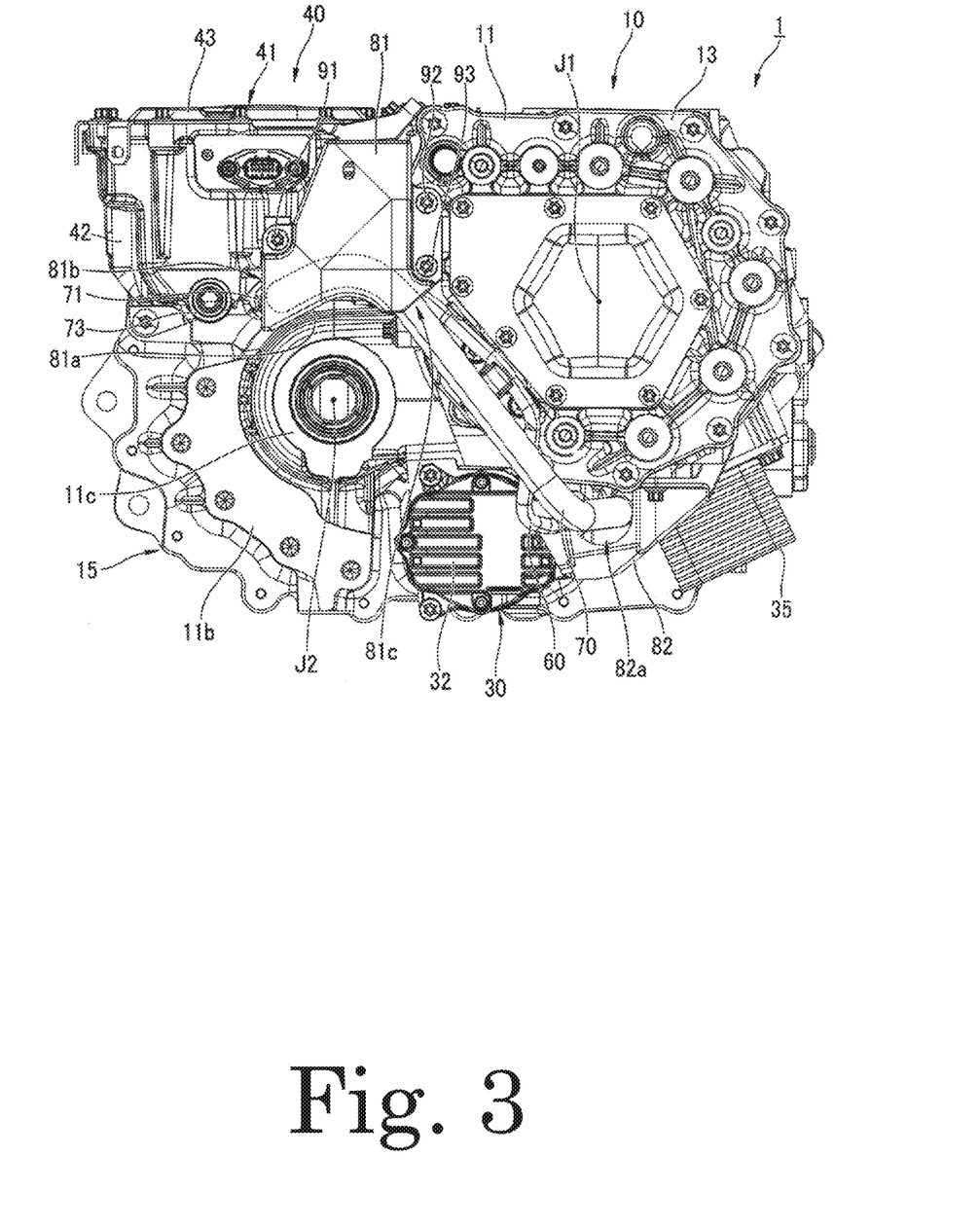
FIG. 3 is a side view of a motor assembly according to an example embodiment of the present disclosure.

The housing 10 houses the motor 20, the speed reducer (not illustrated), and the differential device (not illustrated). Although not illustrated, oil is accommodated in the housing 10. As illustrated in FIGS. 1 to 3, the housing 10 includes a housing body 11, a gear cover 12, and a motor cover 13.

As illustrated in FIG. 2, the housing body 11 includes a motor housing 11a and a coupling portion 11b. The motor housing 11a has a tubular shape surrounding the motor axis J1 and extending in the axial direction. The motor housing 11a is open to the right side, which is the −Y side illustrated in the drawings. The motor housing 11a houses the motor 20. The coupling portion 11b is provided at a left end portion of the motor housing 11a. The coupling portion 11b protrudes to the rear side of the motor housing 11a.

The housing body 11 has a plurality of ribs 11A on a surface of the tubular motor housing 11a. The plurality of ribs 11A include a rib extending in the circumferential direction at a radial end portion of the motor housing 11a and a rib extending in the axial direction. Since the plurality of ribs 11A are provided, the rigidity of the housing body 11 is improved, and it is possible to reduce noise caused by vibration of the housing body 11 when the motor 20 is driven.

The gear cover 12 is fixed to the left side of the housing body 11. More specifically, a right end portion of the gear cover 12 is fixed to the coupling portion 11b with a screw. The gear cover 12 is open to the right side although not illustrated. The gear cover 12 includes a first accommodating portion 12a and a second accommodating portion 12b. The first accommodating portion 12a is located on the left side of the motor housing 11a. The first accommodating portion 12a accommodates the speed reducer (not illustrated). The second accommodating portion 12b is connected to the rear side of the first accommodating portion 12a. The second accommodating portion 12b is located on the left side of the portion of the coupling portion 11b that protrudes to the rear side of the motor housing 11a. The second accommodating portion 12b accommodates the differential device (not illustrated). The first accommodating portion 12a protrudes to the left side of the second accommodating portion 12b. That is, the motor assembly 1 includes the speed reducer and the differential device serving as transmission mechanisms that transmit motive power of the motor 20 to an axle. The gear cover 12 constitutes a gear housing 15, which accommodates the speed reducer and the differential device serving as the transmission mechanisms, together with the coupling portion 11b of the housing body 11.

The motor cover 13 is fixed to the right side of the housing body 11. More specifically, the motor cover 13 is fixed to a right end portion of the motor housing 11a with a screw. As illustrated in FIG. 1, the motor cover 13 closes the opening on the right side of the motor housing 11a.

Figure 8:
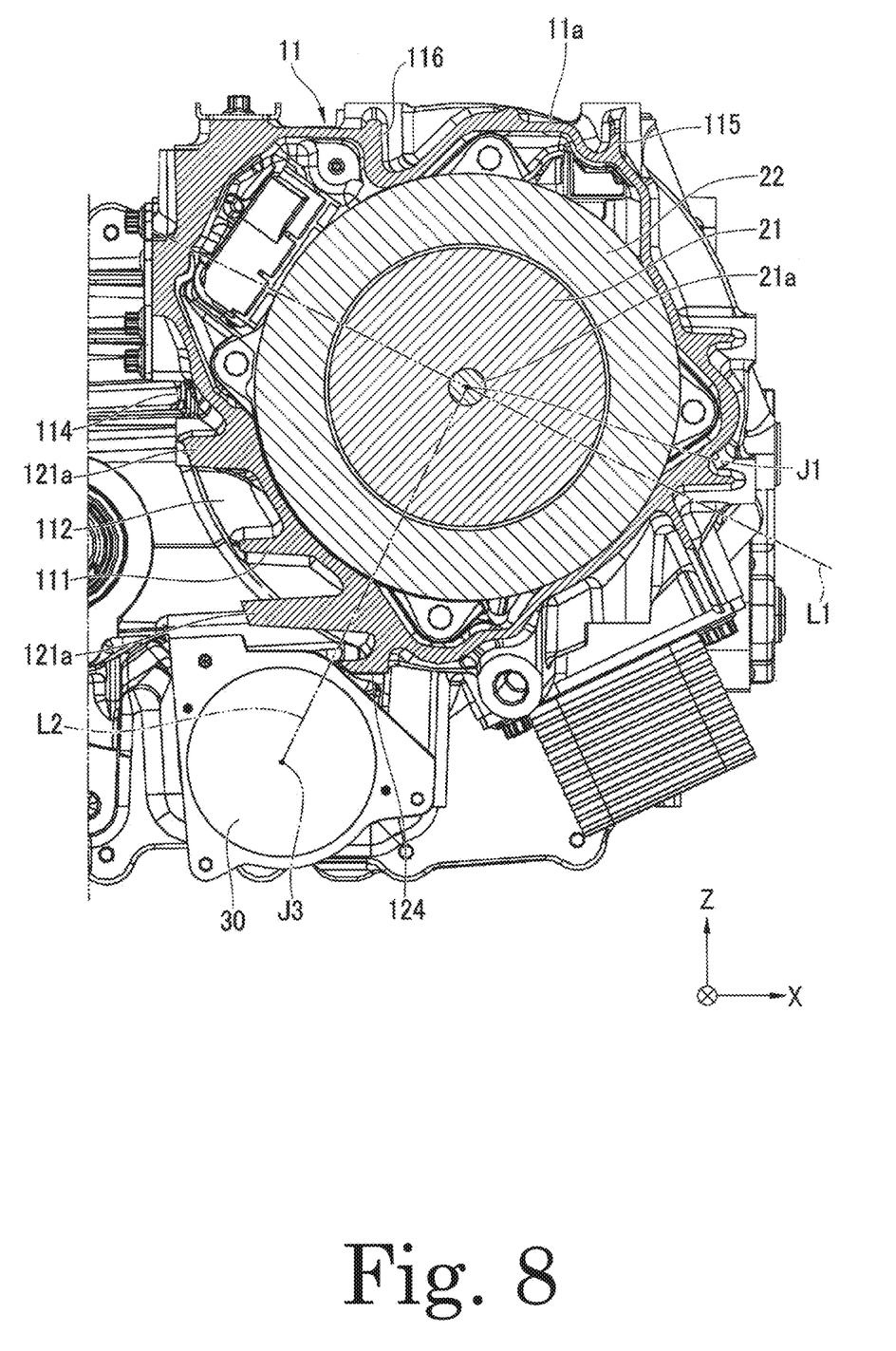
FIG. 8 is a longitudinal cross-sectional view illustrating a motor portion of a motor assembly according to an example embodiment of the present disclosure.

As illustrated in FIG. 8, the motor 20 includes a rotor 21 and a stator 22. The rotor 21 of the motor 20 rotates about the motor axis J1. The rotor 21 of the motor 20 is connected to the speed reducer (not illustrated) accommodated in the gear cover 12. The rotation of the motor 20 is decelerated by the speed reducer (not illustrated) and transmitted to the differential device (not illustrated). The differential device transmits a torque output from the motor 20 to the axle of the vehicle. The differential device has a ring gear that rotates about a differential axis J2 parallel to the motor axis J1. The torque output from the motor 20 is transmitted to the ring gear via the speed reducer.

As illustrated in FIG. 2, the housing 10 has an axle connection portion 11c at the coupling portion 11b. The axle connection portion 11c has a tubular shape that protrudes to the vehicle right side from a surface of the coupling portion 11b facing the vehicle right side (−Y side). The axle connection portion 11c has a circular opening having its center on the differential axis J2. The axle of the vehicle is inserted into the opening of the axle connection portion 11c and connected to the ring gear of the differential device. The vehicle axle is axially rotated about the differential axis J2.

As illustrated in FIGS. 1 and 2, the motor assembly 1 includes an oil pump 30, an oil cooler 35, and an electric actuator 36 as auxiliary devices. The oil pump 30 and the oil cooler 35 are disposed in the lower portion of the housing 10. The oil cooler 35 is located at a lower front end portion of the motor assembly 1. The oil pump 30 is located on the rear side of the oil cooler 35. The electric actuator 36 is disposed in a front portion of the housing 10. The electric actuator 36 is a driving device for a parking lock mechanism.

Figure 5:
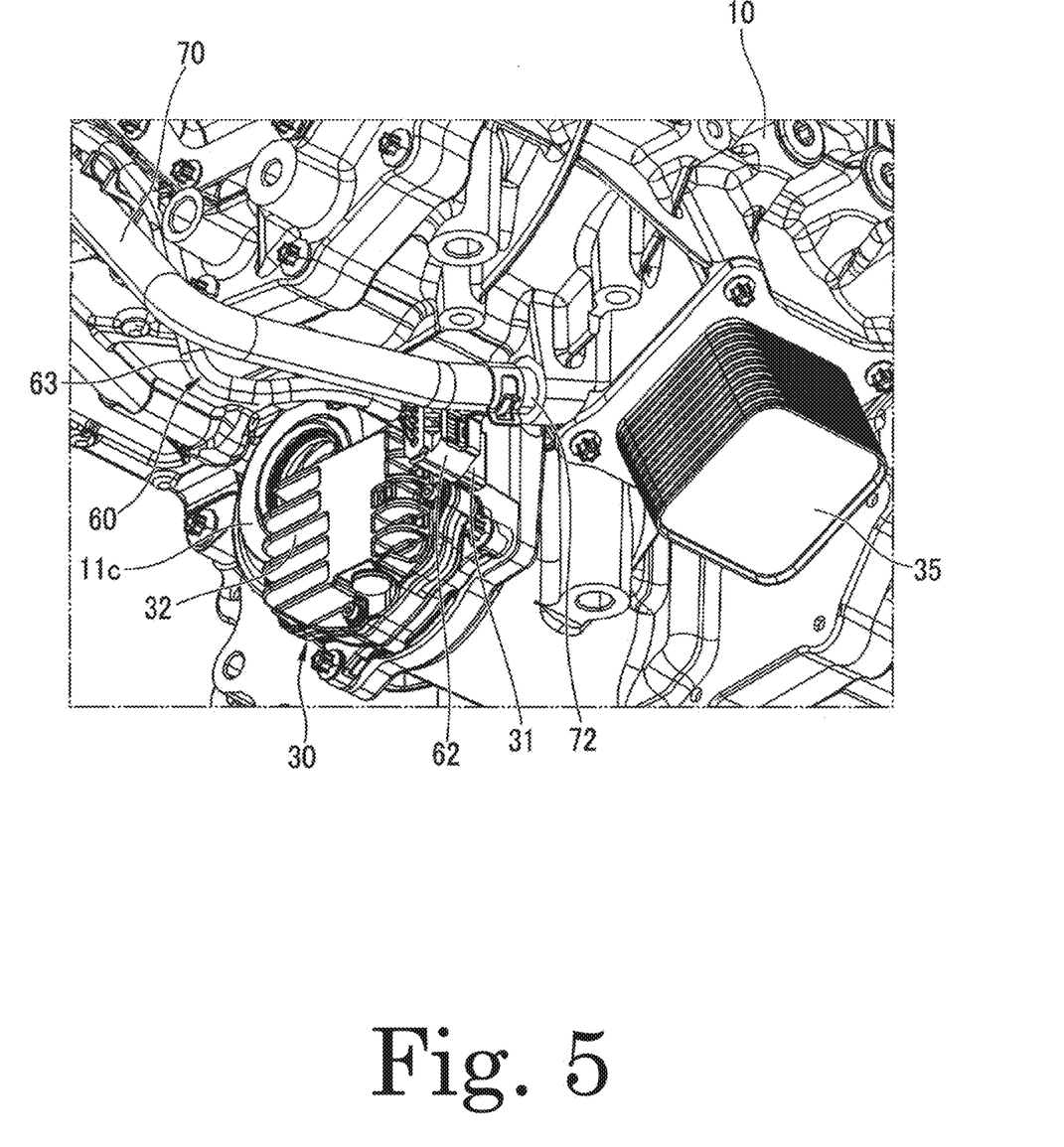
FIG. 5 is a perspective view illustrating a state where a lower connector cover according to an example embodiment of the present disclosure has been detached.

The oil pump 30 is disposed along the motor axis J1. As illustrated in FIG. 5, the oil pump 30 includes a connector 31 and a heat sink 32 in a right end portion. The heat sink 32 is provided on a cover member of the oil pump 30. The heat sink 32 cools a circuit board built in the oil pump 30.

As illustrated in FIGS. 1 and 2, the inverter assembly 40 is located on the rear side of the housing 10. The inverter assembly 40 has an inverter case 41. An inverter (not illustrated) is accommodated in the inverter case 41. The inverter in the inverter case 41 is electrically connected to the stator of the motor 20 and drives the motor 20.

The inverter case 41 is fixed to the housing 10. That is, the inverter case 41 is provided integrally with the housing. In the present example embodiment, the inverter case 41 is fixed to a radially outer surface of the housing 10. More specifically, the inverter case 41 is fixed to a rear portion of the radially outer surface of the motor housing 11a. That is, the inverter case 41 is fixed to the rear side of the housing 10 in the front-rear direction orthogonal to the axial direction.

As illustrated in FIG. 1, the inverter case 41 has a substantially rectangular box shape extending in the axial direction. The inverter case 41 has an inverter case body 42 and an inverter cover 43. The inverter case body 42 has a substantially rectangular box shape that is open on the upper side and is long in the axial direction.

The inverter cover 43 closes the opening on the upper side of the inverter case body 42. The inverter cover 43 includes a first cover 43a and a second cover 43b. The first cover 43a and the second cover 43b are separate members. In the inverter case 41, the inverter (not illustrated) is accommodated in a portion where the first cover 43a is attached. In the inverter case 41, a bus bar (not illustrated) connected to the inverter is accommodated in a portion where the second cover 43b is attached.

As illustrated in FIGS. 1 to 3, a wire harness 60 and a cooling water hose 70 are routed on a side surface of the motor assembly 1 on the right side, that is, the −Y side. Specifically, the wire harness 60 and the cooling water hose 70 extend downward from a right side surface of the inverter case 41 along a lower end portion of the motor cover 13 and wrap around to the lower side of the housing 10.

As illustrated in FIGS. 1 to 3, the motor assembly 1 has a side connector cover 81 at ends, close to the inverter case 41, of the wire harness 60 and the cooling water hose 70. The motor assembly 1 also has a lower connector cover 82 at ends, close to the lower portion of the housing body 11, of the wire harness 60 and the cooling water hose 70. That is, the wire harness 60 and the cooling water hose 70 extend between the side connector cover 81 and the lower connector cover 82 in the motor assembly 1.

Figure 4:
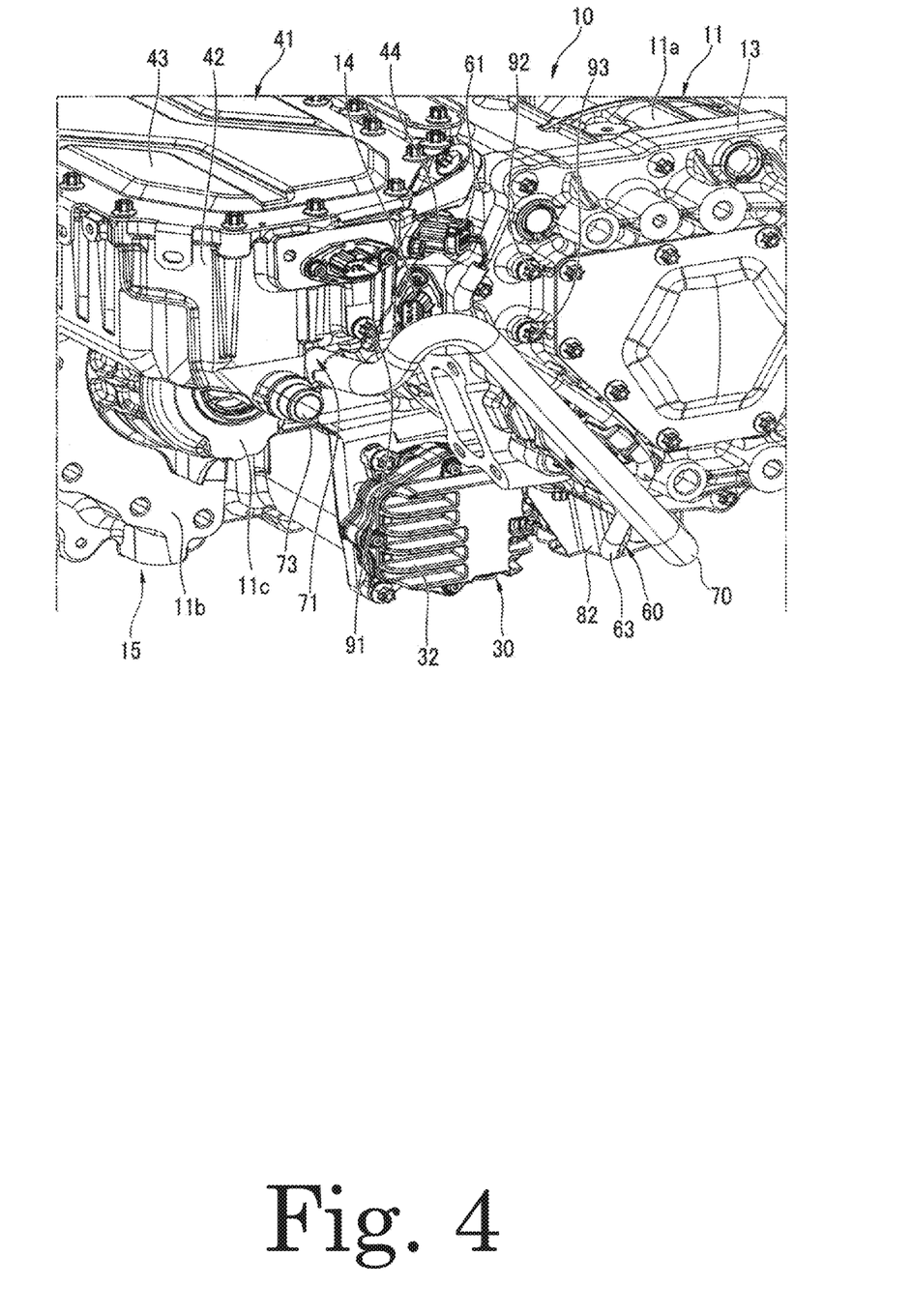
FIG. 4 is a perspective view illustrating a state where a side connector cover according to an example embodiment of the present disclosure has been detached.

As illustrated in FIGS. 4 and 5, the wire harness 60 includes: a first connector 61 connected to a connector 44 of the inverter case 41; a second connector 62 connected to a connector 31 of the oil pump 30 located in the lower portion of the housing 10; and an electric wire 63 connecting the first connector 61 and the second connector 62.

As illustrated in FIG. 4, the inverter case 41 has the connector 44 at a corner on the front side of a right side surface of the inverter case body 42. The connector 44 protrudes obliquely forward from the corner of the inverter case body 42. The connector 44 is located in a gap between the inverter case 41 and the housing body 11 in the front-rear direction. The first connector 61 of the wire harness 60 is connected to the connector 44.

In the inverter case 41, the connector 14 protruding from a surface facing the rear side of the housing body 11 is disposed on the lower side of the connector 44. The connector 14 of the housing body 11 is connected to a partial terminal of the connector 44. Although not illustrated, an electric wire connected to the connector 14 includes an electric wire connected to the first connector 61 and a connector connected to the connector 14. The connector 14 of the housing body 11 protrudes obliquely to the rear right side from a back surface of the housing body 11. That is, a protruding direction of the connector 14 is a direction that intersects a protruding direction of the connector 44 of the inverter case 41. In the present example embodiment, the protruding direction of the connector 14 and the protruding direction of the connector 44 are substantially orthogonal as viewed from above.

As illustrated in FIG. 5, the oil pump 30 and the oil cooler 35 are disposed in the lower portion of the housing 10. The oil pump 30 has the connector 31 for power supply and signal input. The second connector 62 of the wire harness 60 is connected to the connector 31 of the oil pump 30.

As illustrated in FIGS. 4 and 5, the cooling water hose 70 is connected to a hose nipple 71 protruding from the right side surface of the inverter case 41 and to a hose nipple 72 located in the lower portion of the housing 10.

The inverter case 41 has the two hose nipples 71 and 73 at a lower portion of the right side surface of the inverter case body 42. The hose nipple 73 located on the rear side between the hose nipples 71 and 73 is a cooling water supply port to the inverter case 41. The cooling water hose (not illustrated) is connected to the hose nipple 73. The hose nipple 71 located on the front side between the hose nipples 71 and 73 is a cooling water discharge port from the inverter case 41.

The hose nipple 72 in the lower portion of the housing 10 is a cooling water supply port to the oil cooler 35 attached to the housing body 11. Although not illustrated, the housing 10 has a hose nipple as a cooling water discharge port from the oil cooler 35. A lower end portion of the cooling water hose 70 is connected to the hose nipple 72.

The hose nipple 72 and the connector 31 of the oil pump are disposed at positions close to each other in the lower portion of the housing 10. Specifically, the oil cooler 35 and the oil pump 30 are disposed side by side. The hose nipple 72 connected to the oil cooler 35 is located at a rear end portion of the oil cooler 35. The connector 31 of the oil pump 30 is located at a front end portion of the oil pump 30.

The side connector cover 81 covers the connector 44 of the inverter case 41 and the first connector 61 of the wire harness 60, the connector 14 of the housing 10, and a part of the cooling water hose 70 from the lateral side as illustrated in FIG. 3.

Therefore, the motor assembly 1 of the present example embodiment includes the side connector cover 81, which covers the first connector 61 from the lateral side, on the right side surfaces of the inverter case 41 and the housing 10.

According to this configuration, even when an impact is applied from a side surface of the vehicle, it is difficult for the wire harness 60 to be disconnected even in the event of a collision since the first connector 61 is protected by the side connector cover 81.

In addition, since the side connector cover 81 also covers the connector 14 of the housing 10 from the lateral side in the present example embodiment, the wire harness connecting the connector 44 and the connector 14 is also protected by the side connector cover 81.

As illustrated in FIGS. 2 and 3, the side connector cover 81 includes a bottom wall 81a facing the lower side, a rear opening 81b that is open to the rear side of the bottom wall 81a, and a front opening 81c that is open to the front side of the bottom wall 81a. As illustrated in FIG. 3, the bottom wall 81a is located on the upper side of the axle connection portion 11c. The connector 14, the connector 44, and the first connector 61 illustrated in FIG. 4 are disposed on the upper side of the bottom wall 81a. As viewed from the axle connected to the axle connection portion 11c, the bottom wall 81a covers the connector 14, the connector 44, and the first connector 61.

That is, the motor assembly 1 of the present example embodiment has a configuration in which the housing 10 has the axle connection portion 11c to which the axle of the vehicle is connected, the connector 44 of the inverter case 41 is located on the radially outer side of the axle connected to the axle connection portion 11c, and the side connector cover 81 covers the first connector 61 as viewed from the axle.

According to this configuration, even when a flying stone hits the axle that rotates in the lower portion of the motor assembly 1 and jumps upward or a liquid adhering to the axle is scattered, the first connector 61 is protected by the bottom wall 81a of the side connector cover 81. Therefore, the connector can be effectively protected from the flying stone or the like during travel of the vehicle.

Figure 6:
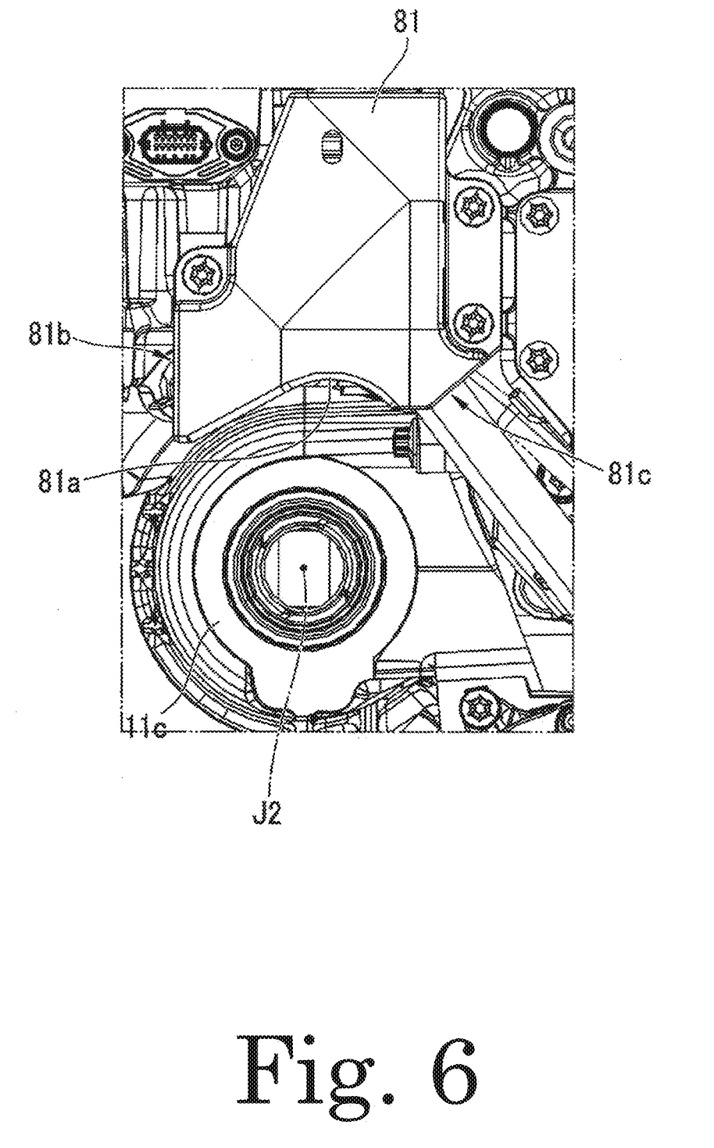
FIG. 6 is a side view illustrating the side connector cover and an axle connection portion.

As illustrated in FIGS. 2 and 6, a lower surface of the bottom wall 81a is a curved surface which is convex upward and extends along the curvature of the axle connected to the axle connection portion 11c. Since the lower surface of the bottom wall 81a is the curved surface, a foreign matter such as a flying stone after being bounced off by at the axle can be bounced back to the road surface side by the lower surface of the bottom wall 81a. As a result, it is possible to prevent the foreign matter bounced back by the side connector cover 81 from hitting or adhering to the other parts of the motor assembly 1.

In addition, the axle has a boot (not illustrated), and the boot is larger in the radial direction than the axle. Since the bottom wall 81a is provided, when climbing a step or the like at high-speed rotation, it is possible to prevent the axle from being deflected and the boot from coming into contact with the connector and the like.

In the present example embodiment, the side connector cover 81 holds a part of the cooling water hose 70 between the side connector cover 81 and the inverter case 41 as illustrated in FIG. 3. The cooling water hose 70 is connected to the hose nipple 71 at the rear opening 81b in the rear end portion of the side connector cover 81. A front portion of the cooling water hose 70 extends to the front lower side from the front opening 81c of the side connector cover 81.

According to this configuration, the cooling water hose 70 is held at the position that does not protrude to the right side of the motor assembly 1, and thus, it is possible to reduce an axial length of the motor assembly 1. In addition, the cooling water hose 70 is less likely to hinder when the motor assembly 1 is mounted on the vehicle, and thus, workability is improved. According to the above configuration, it is possible to suppress contact between the cooling water hose 70 and a vehicle frame or the like, and thus, it is possible to suppress unintentional wear or breakage of the cooling water hose 70.

The side connector cover 81 is disposed to straddle the inverter case 41 and the housing 10 as viewed from the lateral side, and is fixed to both the inverter case 41 and the housing 10. Specifically, the side connector cover 81 is fixed to the inverter case 41 with a bolt 91 and fixed to the motor cover 13 of the housing 10 with two bolts 92 and 93 as illustrated in FIG. 3.

According to this configuration, the side connector cover 81 can more reliably protect both the connector 44 of the inverter case 41 and the connector 14 of the housing 10. If the side connector cover 81 is fixed only to the inverter case 41, the side connector cover 81 corresponding to the portion that covers the connector 14 of the housing 10 is not fixed, and thus, sound is generated due to vibration, and a flying stone or water easily enters through a gap between the housing 10 and the side connector cover 81. Therefore, the connector protection using the side connector cover 81 becomes more reliable according to the configuration of the present example embodiment.

The side connector cover 81 covers the connector 44 of the inverter case 41 and the first connector 61 of the wire harness 60, the connector 14 of the housing 10, and a part of the cooling water hose 70 from the lateral side as illustrated in FIG. 3.

Therefore, the motor assembly 1 of the present example embodiment includes the side connector cover 81, which covers the first connector 61 from the lateral side, on the right side surfaces of the inverter case 41 and the housing 10. According to this configuration, even when an impact is applied from a side surface of the vehicle, it is difficult for the wire harness 60 to be disconnected even in the event of a collision since the first connector 61 is protected by the side connector cover 81.

The lower connector cover 82 covers the connector 31 of the oil pump 30, the second connector 62 of the wire harness 60 connected to the connector 31, and the hose nipple 72 of the housing 10 from the lower side, in the lower portion of the housing 10 as illustrated in FIGS. 2 and 5. As illustrated in FIGS. 2 and 3, the lower connector cover 82 has an opening 82a that is open to the right. The wire harness 60 and the cooling water hose 70 are inserted into the lower connector cover 82 through the opening 82a. The lower connector cover 82 is fixed to the lower surface of the housing body 11 by a plurality of bolts including the bolt 93 illustrated in FIG. 2.

Therefore, the motor assembly 1 of the present example embodiment includes the lower connector cover 82 that covers the second connector 62 from the lower side in the lower portion of the housing 10. According to this configuration, the second connector 62 is protected from a flying stone, road surface water, and the like in the lower portion of the motor assembly 1 exposed on the lower surface of the vehicle, and thus, the wire harness 60 is unlikely to be disconnected in the connector and in the periphery thereof.

In addition, the second connector 62 of the wire harness is protected by the lower connector cover 82 even when the electronic component such as the oil pump 30 is disposed in the lower portion of the motor assembly 1 according to the motor assembly 1 of the present example embodiment. That is, the connector and the periphery thereof, which are likely to be disconnected, can be disposed in the lower portion of the motor assembly 1 according to the motor assembly 1 of the present example embodiment. Therefore, restrictions on the arrangement of the electronic components in the motor assembly 1 are reduced according to the present example embodiment.

In addition, the motor assembly 1 of the present example embodiment includes the cooling water hose 70 connected to the hose nipple 71 of the inverter case 41 and to the hose nipple 72 of the housing 10, and the lower connector cover 82 is configured to cover the second connector 62 and the hose nipple 72 of the housing 10 from the lower side. According to this configuration, connecting portions of the cooling water hose 70 are also protected from a flying stone.

Since the connector 31 of the oil pump 30 and the hose nipple 72 are disposed close to each other in the present example embodiment, the lower connector cover 82 covering the connector 31 and the hose nipple 72 can be made small. As a result, it is possible to configure the lower portion of the motor assembly 1 such that only a portion that needs to be protected from a flying stone is covered by the lower connector cover 82 and a portion that needs to be cooled, for example, is not covered by the lower connector cover 82.

Specifically, the motor assembly 1 of the present example embodiment has the configuration in which the oil pump 30 has the heat sink 32 that cools the internal components of the oil pump 30, and the heat sink 32 is located outside the lower connector cover 82. According to this configuration, the heat sink 32 is exposed in the lower portion of the motor assembly 1, and thus, the heat sink 32 and the internal components of the oil pump 30 are efficiently cooled during travel of the vehicle.

Figure 7:
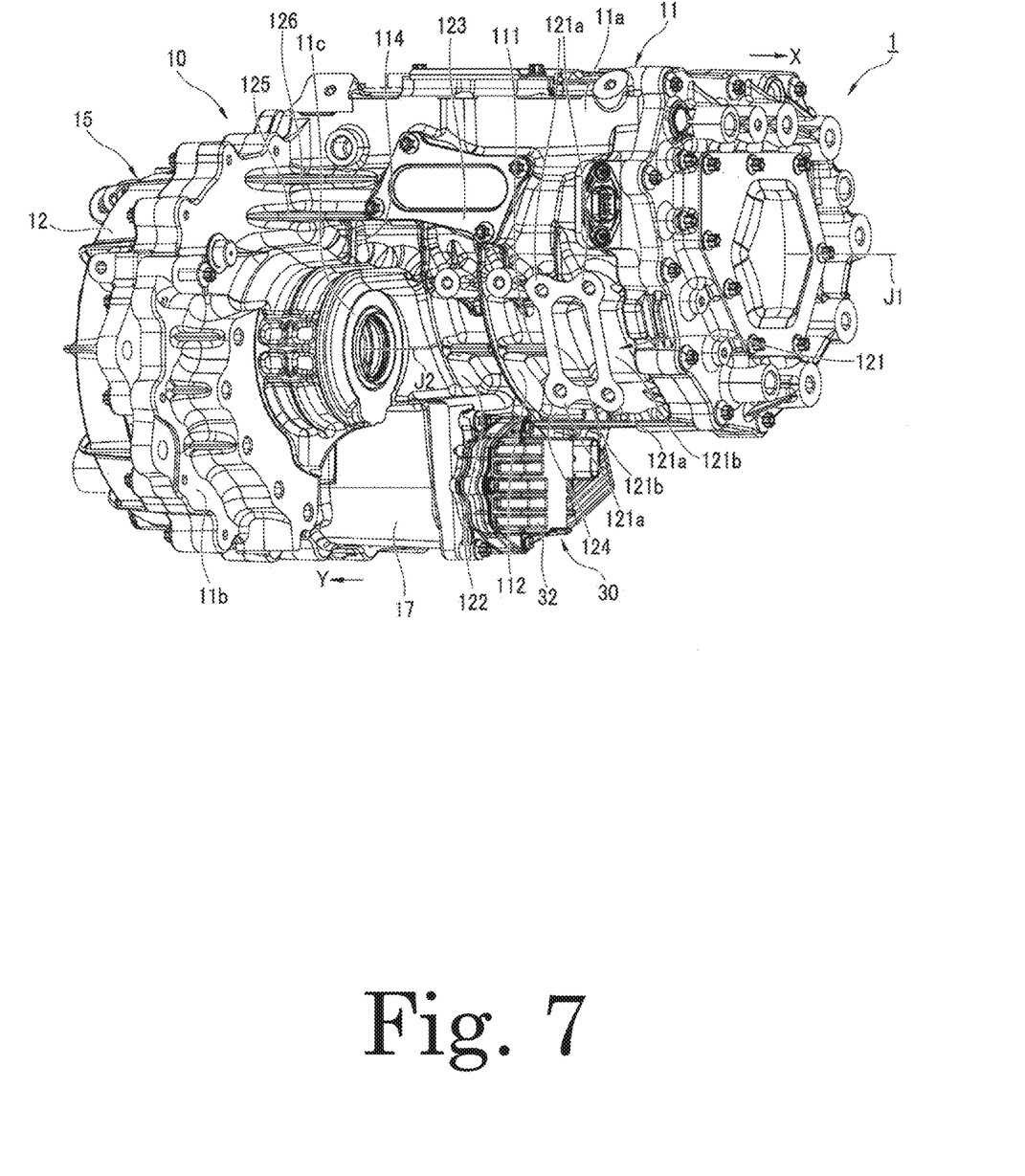
FIG. 7 is a perspective view illustrating a state where an inverter assembly has been detached.

FIG. 7 is a perspective view of the motor assembly 1 according to the example embodiment from which the inverter assembly 40 has been detached as viewed from the rear side. FIG. is a longitudinal cross-sectional view illustrating a motor portion of the motor assembly 1 according to the example embodiment.

In the motor assembly 1 of the present example embodiment, the housing 10 has a pump housing 17 provided on an outer circumferential surface of the motor housing 11a as illustrated in FIG. 7. The pump housing 17 has a tubular shape that is open on both sides in the Y-axis direction. An opening of the pump housing 17 facing the vehicle left side (+Y side) is open inside the gear housing 15. The oil pump 30 is inserted into an opening of the pump housing 17 facing the vehicle right side (−Y side). In the present example embodiment, the oil pump 30 is an electric oil pump. The oil pump 30 is fixed to the opening on the right side of the pump housing 17 by bolt fastening. The oil pump 30 circulates oil inside the housing 10.

In the motor assembly 1, the heavy oil pump 30 is disposed in the lower portion of the motor housing 11a. In this configuration, when the oil pump 30 vibrates in the radial direction of the motor housing 11a, the motor housing 11a itself connected to the pump housing 17 may deform and vibrate, which causes noise in some cases.

Conventionally, various countermeasures against the motor vibration have been known. For example, there are known a method for reducing an excitation force that excites vibration and a method for reducing vibration at a motor attachment portion.

A motor assembly used as a vehicle driving device as in the present example embodiment is configured by combining a motor, a gear, an electric oil pump, and the like. In such a motor assembly, the motor assembly vibrates due to arrangement and weight balance of components, and thus, there is a case where the vibration is insufficiently reduced with the conventional vibration countermeasures.

Therefore, in the motor assembly 1 of the present example embodiment, a rib 111 extending along the direction of the motor axis J1 and a rib 112 orthogonal to the rib 111 are provided at a lower portion of a side surface facing the rear side of the motor housing 11a as illustrated in FIGS. 7 and 8. The rib 112 extends along the circumferential direction around the motor axis J1.

The motor housing 11a includes a plurality of radial protrusions 121, 122, 123, and 124 that protrude to the radially outer side from the side surface of the motor housing 11a. Both ends of the rib 111 are connected to the radial protrusions 121 and 122. Both ends of the rib 112 are connected to the radial protrusions 123 and 124.

The radial protrusion 121 is a boss coupler having a rectangular frame shape in a plan view. The radial protrusion 121 has four bosses 121a and four plate-shaped coupling ribs 121b. The coupling rib 121b couples the two bosses 121a adjacent in the axial direction or the circumferential direction. The end on the vehicle right side (−Y side) of the rib 111 is connected to a side surface facing the vehicle left side (+Y side) of the coupling rib 121b located at an end on the vehicle left side (+Y side) of the radial protrusion 121.

The radial protrusion 122 is a casing portion that extends in the radial direction from the side surface of the motor housing 11a and is coupled to a side surface of the axle connection portion 11c. The radial protrusion 122 has a side surface facing the vehicle right side (−Y side) between the motor housing 11a and the axle connection portion 11c. The end on the vehicle left side (+Y side) of the rib 111 is connected to the side surface facing the vehicle right side (−Y side) of the radial protrusion 122.

The radial protrusion 123 is a connector that connects the motor 20 and the inverter assembly 40. The radial protrusion 123 protrudes to the rear side (−X side) from the side surface of the motor housing 11a. The upper end of the rib 112 is connected to a side surface facing the lower side of the radial protrusion 123.

The radial protrusion 124 is a rib that protrudes to the radially outer side from the lower portion of the motor housing 11a. The lower end of the rib 112 is connected to the side surface facing the rear side (−X side) of the radial protrusion 124.

The rib 111 extends along the motor axis J1 between the radial protrusions 121 and 122. The rib 112 extends along the circumferential direction between the radial protrusions 123 and 124. The rib 111 and the rib 112 intersect each other at the center of a region surrounded by the four radial protrusions 121 to 124. In the present example embodiment, the rib 111 and the rib 112 are substantially orthogonal as viewed in the front-rear direction (X-axis direction).

As illustrated in FIGS. 7 and 8, the oil pump 30 is located on the radially outer side of the motor housing 11a. More specifically, as illustrated in FIG. 8, the oil pump 30 is located slightly on the rear side of the lower portion of the motor housing 11a as viewed in the direction along the motor axis J1. The ribs 111 and 112 are located in the lower portion of the side surface facing the rear side of the motor housing 11a. That is, the motor housing 11a has the rib 111 and the rib 112 that protrude to the radially outer side from the side surface of the motor housing 11a on the side surface facing the oil pump 30 side.

The positions of the ribs 111 and 112 may be deviate from the illustrated positions in the circumferential direction as long as falling within a range located below a virtual line L1 illustrated in FIG. 8 on the side surface of the motor housing 11a. The virtual line L1 is a virtual line orthogonal to a virtual line L2 connecting the motor axis J1 and a motor axis J3 of the oil pump 30 in a cross section orthogonal to the motor axis J1 illustrated in FIG. 8.

The oil pump 30 is heavy, and thus, sometimes vibrates in a different period in a direction different from that of the motor 20 during the operation. Then, the oil pump 30 and the motor 20 move so as to approach or separate in the radial direction of the motor axis J1. When the oil pump 30 swings relative to the motor 20 in this manner, the side surface of the motor housing 11a facing the oil pump 30 side is pulled or pushed by the oil pump 30, and thus, the entire motor housing 11a vibrates so as to bend.

According to the motor assembly 1 of the present example embodiment, the ribs 111 and 112 are provided on the side surface of the motor housing 11a facing the oil pump 30 side, and thus, the connecting portion between the motor housing 11a and the oil pump 30 and the peripheral portion thereof are made to be hardly deformed. As a result, a relative amplitude between the oil pump 30 and the motor housing 11a can be reduced, and the vibration of the entire motor assembly 1 can be suppressed. As a result, the noise caused by the vibration can also be reduced.

In the motor assembly 1, the oil pump 30 is disposed so as to overlap the motor housing 11a as viewed in the radial direction of the motor axis J1. In such a configuration, the area where the oil pump 30 and the motor housing 11a face each other is wider than that of a case where the oil pump 30 and the motor housing 11a are disposed to be shifted in the axial direction, and thus, the vibration of the motor housing 11a is easily induced by the vibration of the oil pump 30. Since the ribs 111 and 112 are provided in the configuration of the present example embodiment, it is possible to suppress the vibration of the portion that is likely to vibrate and to obtain a strong vibration suppressing effect as a whole.

In the motor assembly 1, the housing 10 has the pump housing 17 that accommodates the oil pump 30, and the pump housing 17 is provided on the outer circumferential surface of the motor housing 11a. In such a configuration, the pump housing 17 and the motor housing 11a are connected, and thus, the vibration of the motor housing 11a is more easily induced by the vibration of the oil pump 30. Since the ribs 111 and 112 are provided in the configuration of the present example embodiment, it is possible to suppress the vibration of the portion that is likely to vibrate and to obtain a strong vibration suppressing effect as a whole.

In the present example embodiment, the rib 111 has a plate shape extending along the motor axis J1. According to this configuration, the rib 111 is disposed substantially in parallel to the vibration that compresses or stretches the side surface of the motor housing 11a in the direction along the motor axis J1. Since the rib 111 is disposed in a posture that is hardly deformed with respect to the vibration, the vibration of the motor housing 11a can be suppressed.

In the present example embodiment, the rib 112 has a plate shape extending along the circumferential direction around the motor axis J1. When the oil pump 30 moves relative to the motor 20 in the radial direction, the motor housing 11a is deformed into an elliptical shape having the virtual lines L1 and L2 as major and minor axes, respectively, in the cross section illustrated in FIG. 8. Since the rib 112 extending in the circumferential direction is provided, it is possible to suppress the deformation of the motor housing 11a into the elliptical shape, and to reduce the vibration of the entire motor housing 11a.

In addition, the rib 115 and the rib 116 are also provided on the side surface of the motor housing 11a that faces the side opposite to the oil pump 30 in the motor assembly 1 of the present example embodiment. In the present example embodiment, the ribs 115 and 116 are located on the upper surface of the motor housing 11a. The ribs 115 and 116 have a plate shape extending along the motor axis J1. According to this configuration, the upper surface portion of the motor housing 11a can be made to be hardly deformed. The upper surface of the motor housing 11a has a relatively wide surface that is not connected to the other members of the motor assembly 1, and thus, is more likely to vibrate than the other portions of the motor housing 11a. Since the ribs 115 and 116 are provided on the upper surface of the motor housing 11a that is likely to vibrate in this manner, the entire motor housing 11a is hardly deformed, and thus, the vibration of the motor housing 11a is further suppressed.

Incidentally, the motor housing 11a may be configured not to include the ribs 115 and 116 on the upper surface.

The motor assembly 1 of the present example embodiment includes the gear housing 15 that accommodates the transmission mechanism, and the motor housing 11a and the pump housing 17 are fixed to a side surface of the coupling portion 11b constituting the gear housing 15, the side surface facing in the direction of the motor axis J1. When the motor housing 11a and the pump housing 17 are fixed to the side surface of the common coupling portion 11b, the oil pump 30 swings in the radial direction of the motor housing 11a with the connection portion between the oil pump 30 and the coupling portion 11b as a fulcrum. Thus, the amplitude of vibration increases at the end of the oil pump 30 on the side opposite to the gear housing 15, and the side surface of the motor housing 11a is likely to be deformed. Since the ribs 111 and 112 are provided in the configuration of the present example embodiment, it is possible to suppress the vibration of the portion that is likely to vibrate and to obtain a strong vibration suppressing effect as a whole.

As illustrated in FIG. 7, the housing 10 of the motor assembly 1 of the present example embodiment includes the gear housing 15 that accommodates the transmission mechanism and the axle connection portion 11c to which the axle is connected, and the motor housing 11a and the axle connection portion 11c are disposed to be adjacent to each other in the radial direction of the motor axis J1. Further, the motor assembly 1 has a rib 114 that extends between the motor housing 11a and the axle connection portion 11c in the circumferential direction.

On the upper side of the rib 114, a radial protrusion 125 protruding in the radial direction from the side surface facing the rear side (−X side) of the motor housing 11a is located. In the present example embodiment, the radial protrusion 125 is a plate-shaped rib extending along the direction of the motor axis J1 on the outer circumferential surface of the motor housing 11a. An end on the vehicle left side (+Y side) of the radial protrusion 125 is connected to a surface facing the vehicle right side (−Y side) of the coupling portion 11b. An upper end of the rib 114 is connected to a lower surface of the radial protrusion 125. A lower end of the rib 114 is connected to an upper surface of the axle connection portion 11c.

The axle connection portion 11c is a cylindrical member, and the differential device that is a heavy object is disposed therein. Thus, when the axle connection portion 11c vibrates, the motor housing 11a is deformed similarly to the case where the oil pump 30 vibrates, which may cause noise in some cases. Therefore, the connecting portion between the motor housing 11a and the axle connection portion 11c can be made to be hardly deformed by providing the rib 114 between the motor housing 11a and the axle connection portion 11c. As a result, the vibration of the motor housing 11a can be suppressed, and the generation of noise can be suppressed.

In addition, the rib extending between the motor housing 11a and the gear housing 15 is provided as the radial protrusion 125 in the present example embodiment. As a result, the vibration of the gear housing 15 with the coupling portion between the motor housing 11a and the gear housing 15 as a fulcrum is suppressed. Therefore, it is possible to more effectively suppress the vibration of the motor housing 11a caused by the vibration of the axle connection portion 11c according to the present example embodiment. Further, in the present example embodiment, the rib 126 having the same configuration as the radial protrusion 125 is provided on the upper side of the radial protrusion 125, and thus, a stronger vibration suppressing effect can be obtained in the motor housing 11a and the gear housing 15.

Each configuration described in the present specification can be properly combined within a range in which no conflict occurs.

Although a connection structure between the connector 44 provided in the inverter case 41 and the connector 31 of the oil pump 30 has been described in the present example embodiment, an auxiliary device other than the oil pump 30 can be applied as a connection destination of the inverter case 41. For example, the electric actuator 36 having a parking lock mechanism or the like may be applied as the connection destination.

Although the configuration in which the wire harness 60 and the cooling water hose 70 extend from the side surface of the inverter case 41 to the lower surface of the housing 10 has been described in the present example embodiment, the disclosure is not limited to this configuration. For example, at least one of the wire harness 60 and the cooling water hose 70 may be configured to extend from the upper surface, the rear surface, or the lower surface of the inverter case 41 to the lower surface of the housing 10.

Although the configuration in which the housing 10 and the inverter case 41 as separate cases are connected to be integrated has been described in the present example embodiment, the housing 10 and the inverter case 41 may each be configured as a single member.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor assembly comprising:
   a motor;
   a housing that accommodates the motor;
   an inverter electrically connected to the motor;
   an inverter case that accommodates the inverter;
   an auxiliary device provided in a lower portion of the housing so as to oppose a road surface;
   a wire harness that includes a first connector connected to a connector provided in the inverter case, a second connector connected to a connector provided in the auxiliary device, and an electric wire connecting the first connector and the second connector; and
   a lower connector cover provided in the lower portion of the housing and covering the second connector from a lower side.

2. The motor assembly according to claim 1, wherein the auxiliary device is an oil pump.

3. The motor assembly according to claim 2, further comprising:
a cooling water hose connected to a hose nipple provided in the inverter case and to a hose nipple of the housing; wherein
the lower connector cover covers the second connector and the hose nipple of the housing from the lower side.

4. The motor assembly according to claim 3, wherein
the oil pump includes a heat sink that cools an internal component of the oil pump; and
the heat sink is located outside the lower connector cover.

5. The motor assembly according to claim 4, further comprising:
a side connector cover that covers the first connector from a lateral side.

6. The motor assembly according to claim 5, wherein the inverter case is provided integrally with the housing that accommodates the motor.

7. The motor assembly according to claim 3, further comprising:
a side connector cover that covers the first connector from a lateral side.

8. The motor assembly according to claim 3, wherein the inverter case is provided integrally with the housing that accommodates the motor.

9. The motor assembly according to claim 2, wherein
the oil pump includes a heat sink that cools an internal component of the oil pump; and
the heat sink is located outside the lower connector cover.

10. The motor assembly according to claim 9, further comprising:
a side connector cover that covers the first connector from a lateral side.

11. The motor assembly according to claim 9, wherein the inverter case is provided integrally with the housing that accommodates the motor.

12. The motor assembly according to claim 2, further comprising:
a side connector cover that covers the first connector from a lateral side.

13. The motor assembly according to claim 2, wherein the inverter case is provided integrally with the housing that accommodates the motor.

14. The motor assembly according to claim 1, further comprising:
a cooling water hose connected to a hose nipple provided in the inverter case and to a hose nipple of the housing; wherein
the lower connector cover covers the second connector and the hose nipple of the housing from the lower side.

15. The motor assembly according to claim 14, further comprising:
a side connector cover that covers the first connector from a lateral side.

16. The motor assembly according to claim 14, wherein the inverter case is provided integrally with the housing that accommodates the motor.

17. The motor assembly according to claim 1, further comprising:
a side connector cover that covers the first connector from a lateral side.

18. The motor assembly according to claim 1, wherein the inverter case is provided integrally with the housing that accommodates the motor.

\* \* \* \* \*